A. Ivers,
Water Closet.
No. 108,146. Patented Oct. 11. 1870.
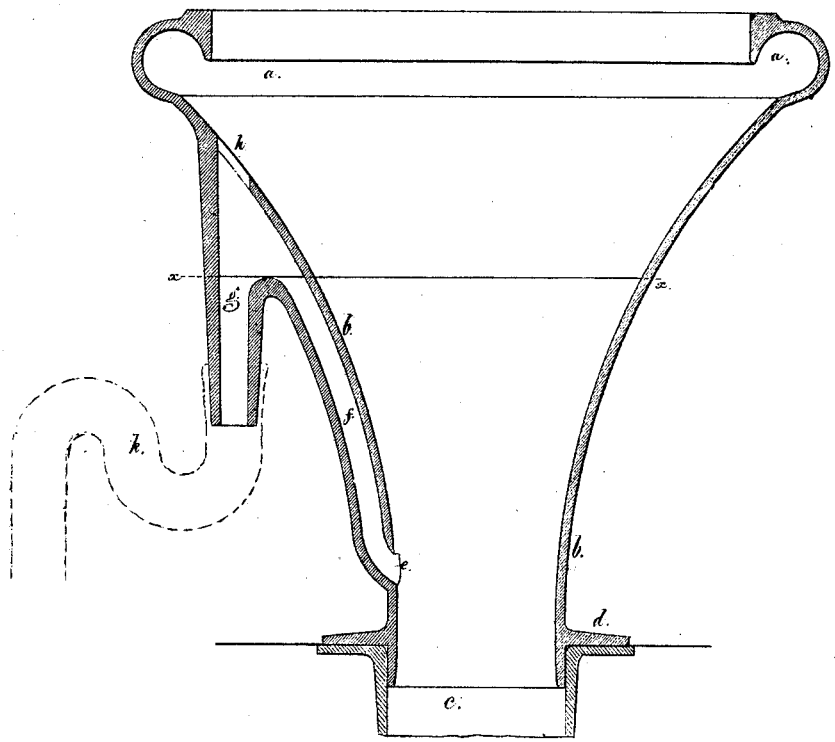
Witnesses
Chas H Smith
Geo D Walker
Alfred Ivers

United States Patent Office.

ALFRED IVERS, OF NEW YORK, N. Y.

Letters Patent No. 108,146, dated October 11, 1870.

IMPROVEMENT IN WATER-CLOSET HOPPERS.

The Schedule referred to in these Letters Patent and making part of the same.

*To all whom it may concern:*

Be it known that I, ALFRED IVERS, of the city and State of New York, have invented and made a new and useful Improvement in Water-closet Hoppers; and I do hereby declare the following to be a full, clear, and exact description of the said invention, reference being had to the annexed drawing, making part of this specification, wherein I have represented a vertical section of the said hopper.

Hoppers for water-closets have heretofore been made with a horn, for supplying water, and with sides tapering down to the discharge-pipe, which pipe connects with or is formed as a trap, for preventing smell passing out of the sewer-pipe, but in these traps there is frequently an accumulation that stops up the trap, and, if the water is allowed to run into the closet, there is an overflow of very offensive material. This contingency is especially likely to happen where there is a periodical flow of water into the closet from a cistern, such as shown in Letters Patent granted to me October 23, 1866.

My present invention is to remove all risk of overflow from the stoppage of water-closet traps.

My invention consists in combining with a water-closet hopper a primary and secondary overflow, so constructed and arranged that paper or floating substances cannot obstruct the primary overflow, and the secondary overflow is so arranged that if the primary overflow becomes obstructed by accumulation of substances that remain partially in suspension in the water, the secondary overflow may be available, and this secondary overflow also supplies a small quantity of fresh water, from time to time, to the trap of the overflow, to keep that water from becoming offensive; it being understood that neither the primary nor secondary overflow are brought into use except when the main trap of the water-closet is obstructed.

In the drawing—

$a$ represents the ring of the hopper, surrounding the upper end, and into which the water is supplied from a horn, in the usual manner.

$b\ b$ are the inclined sides of the hopper, tapering down to the discharge of soil-pipe $c$.

$d$ is the flange at the base, supporting the water-closet.

At one side of the hopper is the primary overflow $e$, leading into the ascending pipe $f$, that connects with the horn $g$, and over this is the secondary overflow opening $h$.

It is to be understood that from the horn $g$ a pipe leads away to the sewer-pipe below the main trap; and that in this pipe a trap is introduced. The trap is illustrated by dotted lines at $k$.

It will now be seen that if the main trap is stopped, and the water rises in the hopper, any substance that may float will pass by the primary opening $e$, because there is no current running through the same until the water rises as high as the line $x$; and, hence, material floating on the surface will remain and not obstruct the overflow.

If from any cause the primary overflow $e$ may become obstructed, the water may rise, and the secondary overflow $h$ then becomes operative.

Under ordinary circumstances there is sufficient clear water running through this secondary opening $h$, from the wash of the closet, to keep the primary opening $e$ clean, and also to change the water from time to time in the trap of the overflow-pipe.

I claim as my invention—

The overflow horn $g$ and primary and secondary openings $e$ and $h$, introduced into and combined with the water-closet hopper $b$, and supply-water ring $a$, in the manner specified, so that water, in washing the closet, passes into the opening $h$, for the purposes specified.

In witness whereof, I have hereunto set my signature this 7th day of February, A. D. 1870.

ALFRED IVERS.

Witnesses:
HAROLD SERRELL,
GEO. T. PINCKNEY.